(12) United States Patent
Matsunaga et al.

(10) Patent No.: US 10,625,735 B2
(45) Date of Patent: Apr. 21, 2020

(54) VEHICLE CONTROL APPARATUS AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Syogo Matsunaga, Kariya (JP); Jun Tsuchida, Okazaki (JP); Ichiro Aizawa, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 154 days.

(21) Appl. No.: 15/562,209

(22) PCT Filed: Mar. 8, 2016

(86) PCT No.: PCT/JP2016/057136
§ 371 (c)(1),
(2) Date: Sep. 27, 2017

(87) PCT Pub. No.: WO2016/158237
PCT Pub. Date: Oct. 6, 2016

(65) Prior Publication Data
US 2018/0118201 A1 May 3, 2018

(30) Foreign Application Priority Data
Mar. 31, 2015 (JP) ................................. 2015-072916

(51) Int. Cl.
*B60R 21/0134* (2006.01)
*B60W 10/18* (2012.01)
(Continued)

(52) U.S. Cl.
CPC ......... *B60W 30/09* (2013.01); *B60R 21/0134* (2013.01); *B60T 7/12* (2013.01);
(Continued)

(58) Field of Classification Search
CPC ......... B60R 21/0134; B60T 7/12; B60T 7/22; B60T 8/17558; B60T 2201/022;
(Continued)

(56) References Cited

U.S. PATENT DOCUMENTS 6,025,797 A * 2/2000 Kawai ................ B60K 31/0008
342/175
6,122,040 A * 9/2000 Arita ......................... B60T 7/22
180/169

(Continued)

FOREIGN PATENT DOCUMENTS

| JP | H07-120555 | 5/1995 |
| JP | H09-236659 A | 9/1997 |
| JP | 2007-290708 A | 11/2007 |

*Primary Examiner* — Robert T Nguyen
(74) *Attorney, Agent, or Firm* — Knobbe, Martens, Olson & Bear, LLP (57) ABSTRACT

A driving assistance ECU that serves as a vehicle control apparatus performs traveling control of a vehicle based on a detection result of a radar apparatus that detects a target in the periphery of an own vehicle. An angle calculating unit of the driving assistance ECU calculates an axial misalignment angle that is a misalignment amount of an attachment angle of the radar apparatus by statistically processing angle misalignment information of the radar apparatus acquired at a predetermined cycle. A control processing unit sets the angle misalignment amount of the radar apparatus to a predetermined initial angle until a predetermined initial period elapses after startup, and performs operation restriction on traveling control based on the initial angle. After the initial angle elapses after startup, the operation restriction on (Continued)

traveling control is performed based on a calculation value of the axial misalignment angle.

12 Claims, 4 Drawing Sheets

(51) Int. Cl.
| | |
|---|---|
| *B60W 10/30* | (2006.01) |
| *B60W 30/09* | (2012.01) |
| *B60W 50/14* | (2020.01) |
| *G01S 13/93* | (2020.01) |
| *G01S 7/40* | (2006.01) |
| *B60T 7/12* | (2006.01) |
| *B60W 30/08* | (2012.01) |
| *G01S 17/93* | (2020.01) |
| *G08G 1/16* | (2006.01) |
| *B60W 30/085* | (2012.01) |
| *B60T 8/1755* | (2006.01) |
| *G01S 17/02* | (2020.01) |
| *G01S 13/86* | (2006.01) |
| *G01S 13/931* | (2020.01) |
| *B60T 7/22* | (2006.01) |

(52) U.S. Cl.
CPC ......... *B60T 8/17558* (2013.01); *B60W 10/18* (2013.01); *B60W 10/30* (2013.01); *B60W 30/08* (2013.01); *B60W 30/085* (2013.01); *B60W 50/14* (2013.01); *G01S 7/4026* (2013.01); *G01S 13/867* (2013.01); *G01S 13/931* (2013.01); *G01S 17/023* (2013.01); *G01S 17/936* (2013.01); *G08G 1/165* (2013.01); *G08G 1/166* (2013.01); *B60T 7/22* (2013.01); *B60T 2201/022* (2013.01); *B60W 2050/143* (2013.01); *B60W 2420/42* (2013.01); *B60W 2420/52* (2013.01); *B60W 2520/10* (2013.01); *B60W 2520/14* (2013.01); *B60W 2540/18* (2013.01); *B60W 2550/10* (2013.01); *G01S 2007/403* (2013.01); *G01S 2007/4091* (2013.01); *G01S 2013/9353* (2013.01); *G01S 2013/9367* (2013.01); *G01S 2013/9375* (2013.01); *G01S 2013/9389* (2013.01); *G08G 1/16* (2013.01)

(58) Field of Classification Search
CPC ...... B60W 10/18; B60W 10/30; B60W 30/08; B60W 30/085; B60W 30/09; B60W 50/14; B60W 2050/143; B60W 2420/42; B60W 2420/52; B60W 2520/13; B60W 2520/14; B60W 2540/18; B60W 2550/10; G01S 7/4026; G01S 7/4972; G01S 13/867; G01S 13/931; G01S 17/023; G01S 17/936; G01S 2007/403; G01S 2007/4091; G01S 2013/9353; G01S 2013/9367; G01S 2013/9375; G01S 2013/9389; G08G 1/16; G08G 1/165; G08G 1/166

See application file for complete search history.

(56) References Cited

U.S. PATENT DOCUMENTS

| | | | |
|---|---|---|---|
| 6,246,949 B1 | 6/2001 | Shirai et al. | |
| 6,437,731 B1* | 8/2002 | Henrio | G01S 7/4026 342/165 |
| 6,556,166 B1* | 4/2003 | Searcy | G01S 7/4026 342/165 |
| 6,763,318 B1* | 7/2004 | Winter | G01S 13/93 33/288 |
| 7,813,851 B2* | 10/2010 | DeMersseman | G01B 21/24 180/282 |
| 2003/0028291 A1* | 2/2003 | Matsuura | G01S 7/4802 701/1 |
| 2005/0285778 A1* | 12/2005 | Shinagawa | G01S 7/4026 342/173 |
| 2006/0164295 A1* | 7/2006 | Focke | G01S 7/40 342/174 |
| 2006/0290920 A1* | 12/2006 | Kampchen | G01S 17/023 356/139.04 |
| 2007/0013576 A1 | 1/2007 | Shingyoji et al. | |
| 2008/0012752 A1* | 1/2008 | Okamura | G01S 7/4026 342/165 |
| 2010/0057293 A1* | 3/2010 | Hoetzer | G01S 7/4026 701/29.2 |
| 2010/0295722 A1* | 11/2010 | Shingyoji | G01S 7/4026 342/70 |
| 2014/0333473 A1* | 11/2014 | Steinbuch | G01S 13/931 342/174 |
| 2014/0340521 A1* | 11/2014 | Obata | B60R 1/00 348/148 |
| 2014/0347206 A1* | 11/2014 | Steinlechner | G01S 7/4026 342/5 |
| 2016/0124076 A1* | 5/2016 | Nakatani | G01S 7/4026 342/174 |
| 2016/0209211 A1* | 7/2016 | Song | G01B 21/24 |
| 2016/0349356 A1* | 12/2016 | Takaki | G01S 7/4026 |
| 2017/0254881 A1* | 9/2017 | Takaki | G01S 7/4026 |
| 2017/0261600 A1* | 9/2017 | Maennicke | G01S 13/931 |
| 2017/0261601 A1* | 9/2017 | Takaki | G01S 7/40 |
| 2018/0354506 A1* | 12/2018 | Minemura | B60T 7/12 |
| 2019/0101621 A1* | 4/2019 | Machida | G01S 7/4026 |
| 2019/0107610 A1* | 4/2019 | Hanai | G01S 7/4972 |

* cited by examiner

VEHICLE CONTROL APPARATUS AND VEHICLE CONTROL METHOD

CROSS-REFERENCE TO RELATED APPLICATIONS

The present application is based on and claims the benefit of priority from Japanese Patent Application No. 2015-072916, filed on Mar. 31, 2015, the descriptions of which are incorporated herein by reference.

TECHNICAL FIELD

The present disclosure relates to a vehicle control apparatus that performs traveling control of an own vehicle with respect to a target ahead of the own vehicle that has been detected by a target detection apparatus, and a vehicle control method performed by the vehicle control apparatus.

BACKGROUND ART

Pre-crash safety (PCS) systems that reduce or prevent collision damage between an obstacle (target) and an own vehicle have been produced. The obstacle is another vehicle, a pedestrian, a road structure, or the like present ahead of the own vehicle that has been detected by a target detection apparatus, such as an imaging apparatus or a radar apparatus. In PCS, a collision prediction time (time to collision [TTC]) is determined based on a relative distance between the own vehicle and the obstacle, and a relative speed or a relative acceleration. The collision prediction time is an amount of time until a collision occurs between the own vehicle and the obstacle. Based on the collision prediction time, a driver of the own vehicle is notified of approach by a warning apparatus of the own vehicle, or a braking apparatus of the own vehicle is operated.

However, when axial misalignment in which an attachment angle of the target detection apparatus becomes tilted occurs, an obstacle that is not actually positioned ahead of the own vehicle may be erroneously detected as being ahead of the own vehicle. Safety apparatuses, such as the warning apparatus and the braking apparatus, may be unnecessarily operated. The axial misalignment of the target detection apparatus may occur as a result of vibrations applied during vehicle traveling, an occurrence of light impact on the own vehicle, and the like.

Therefore, since the past, axial misalignment detection for the target detection apparatus has been performed. For example, when a radar apparatus is used as the target detection apparatus, misalignment information of the attachment angle of the radar apparatus is acquired from a movement trajectory of a road-side object detected by the radar apparatus. Then, as a result of a history of the misalignment information being statistically processed, an axial misalignment angle is calculated. The axial misalignment angle is the misalignment angle of the attachment angle of the radar apparatus. However, when the axial misalignment angle is calculated by statistical processing, time is required until determination accuracy regarding the axial misalignment improves.

Therefore, in PTL 1, in light of the fact that the axial misalignment of the radar apparatus serving as the target detection apparatus occurs as a result of light impact on the own vehicle, a determination that axial misalignment may have occurred is made when an acceleration sensor detects deceleration of a predetermined value or more. Then, the axial misalignment angle is calculated through use of a map that indicates a relationship between the deceleration detected by the acceleration sensor and the axial misalignment angle. As a result, axial misalignment caused by light impact can be quickly detected in a traveling state of the own vehicle.

CITATION LIST

Patent Literature

[PTL 1] JP-A-2007-290708

SUMMARY OF INVENTION

In PTL 1, described above, the occurrence of axial misalignment may not be detected in cases in which axial misalignment resulting from light impact or the like occurs during a stopped state (a state in which ignition is off) of the own vehicle. Therefore, there is room for improvement in suppressing unnecessary assistance operations, while improving detection accuracy regarding the axial misalignment angle of the target detection apparatus.

The main object of the present disclosure is to provide a vehicle control apparatus that is capable of suppressing unnecessary assistance operations of an own vehicle with respect to a target, and a vehicle control method.

A first aspect of the present disclosure is a vehicle control apparatus (10) that is applied to a vehicle in which a target detecting means (21) that detects a target in a periphery of an own vehicle (50) is provided, and performs traveling control of the vehicle based on a detection result of the target detecting means. The vehicle control apparatus includes: an acquiring means for acquiring, at a predetermined cycle, angle misalignment information of the target detecting means that is calculated based on a detection position of the target by the target detecting means; an angle calculating means that calculates an axial misalignment angle that is a misalignment amount of an attachment angle of the target detecting means, by statistically processing a history after startup of the angle misalignment information acquired by the acquiring means; a first control means for performing operation restriction on traveling control based on a predetermined initial angle until a predetermined initial period elapses after the startup, the initial angle being set to the misalignment amount of the attachment angle of the target detecting means; and a second control means for performing the operation restriction on traveling control based on the axial misalignment angle calculated by the angle calculating means after the elapse of the initial period after the startup.

According to the first aspect of the present disclosure, until the elapse of the predetermined initial period after startup, the operation restriction on traveling control can be performed from the beginning of startup of the vehicle control apparatus through use of the predetermined initial angle. In addition, as a result of the initial angle being provisionally set, unexpected unnecessary operations can be suppressed in traveling control at the beginning of startup of the vehicle control apparatus. Furthermore, after the initial period elapses after startup of the vehicle control apparatus, the operation restriction on traveling control is performed based on a calculation value of the axial misalignment angle. Therefore, unnecessary operations can be suppressed in traveling control based on the accuracy of the axial misalignment angle at this time.

BRIEF DESCRIPTION OF DRAWINGS

The above-described object, other objects, characteristics, and advantages of the present disclosure will clarified through the detailed description below, with reference to the accompanying drawings. In the drawings.

DESCRIPTION OF EMBODIMENTS

Each embodiment will hereinafter be described with reference to the drawings. Sections that are identical or equivalent to each other among the following embodiments are given the same reference numbers in the drawings. Descriptions of sections having the same reference numbers are applicable therebetween A vehicle control apparatus according to the present embodiment is mounted in a vehicle (own vehicle). The vehicle control apparatus functions as a PCS system that detects an obstacle (referred to, hereafter, as a target) present ahead of the own vehicle and performs control to prevent a collision with the target or reduce collision damage.

Figure 1:
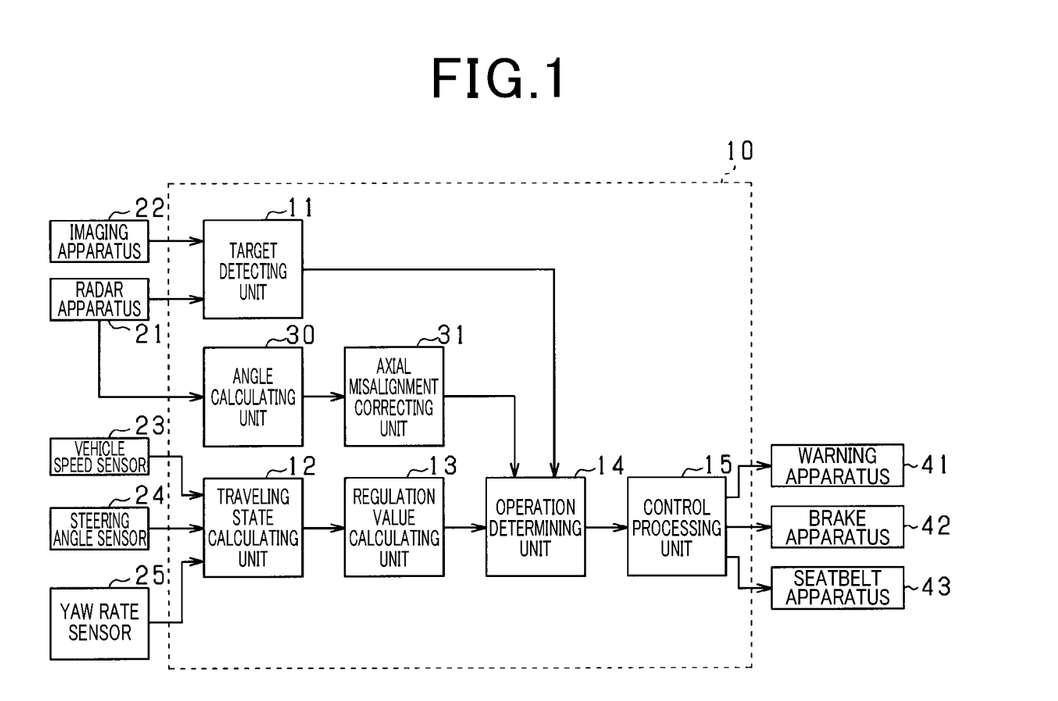
FIG. 1 is a configuration diagram showing a vehicle control apparatus according to an embodiment.

In FIG. 1, a driving assistance electronic control unit (ECU) 10 that is the vehicle control apparatus is a computer that includes a central processing unit (CPU), a read-only memory (ROM), a random access memory (RAM), an input/output (I/O) interface, and the like (not shown). The driving assistance ECU 10 actualizes each function as a result of the CPU running programs installed in the ROM. Therefore, the ROM corresponds to a storage medium (non-transitory computer readable medium).

As sensor apparatuses that input various types of detection information, a radar apparatus 21, an imaging apparatus 22, a vehicle speed sensor 23, a steering angle sensor 24, and a yaw rate sensor 25 are connected to the driving assistance ECU 10.

Figure 2:
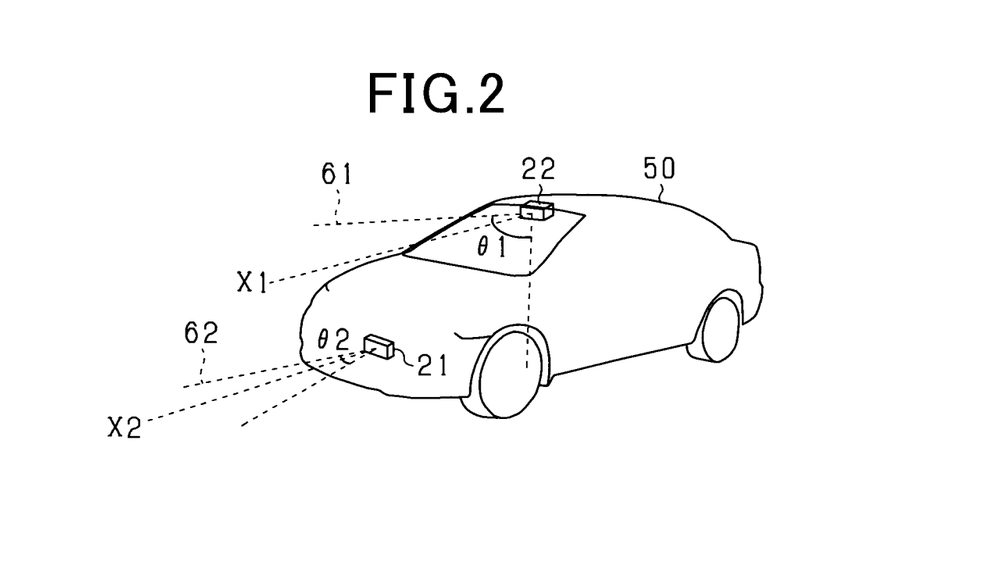
FIG. 2 is a diagram showing an arrangement of an imaging apparatus and a radar apparatus according to an embodiment.

The radar apparatus 21 is an apparatus that transmits electromagnetic waves as transmission waves, and detects a target in the periphery of an own vehicle 50 by receiving reflected waves of the electromagnetic waves. For example, the radar apparatus 21 is configured by a millimeter-wave radar or a laser radar. As shown in FIG. 2, the radar apparatus 21 is attached to a front portion of the own vehicle 50 such that an optical axis X2 thereof faces ahead of the vehicle. In addition, the radar apparatus 21 scans an area 62 by radar signals. The area 62 spreads over a range of a predetermined angle θ2 ahead of the vehicle with the optical axis X2 at the center. The radar apparatus 21 then generates distance measurement data based on an amount of time from the transmission of electromagnetic waves ahead of the vehicle until the reception of reflected waves. The radar apparatus 21 transmits the generated distance measurement data to the driving assistance ECU 10. The distance measurement data includes information related to an orientation at which the target is present, a distance to the target, and a relative speed.

The imaging apparatus 22 is an onboard camera. The imaging apparatus 22 is configured by a charge-coupled device (CCD) camera, a complementary metal-oxide semiconductor (CMOS) image sensor, a near-infrared camera, or the like. The imaging apparatus 22 captures an image of a peripheral environment including a traveling road of the own vehicle 50. The imaging apparatus 22 generates image data expressing the captured image and successively outputs the image data to the driving assistance ECU 10. As shown in FIG. 2, for example, the imaging apparatus 22 according to the present embodiment is set near an upper side of a front windshield of the own vehicle 50. The imaging apparatus 22 captures an image of an area 61 that spreads over a range of a predetermined angle θ1 (θ1>θ2) ahead of the vehicle with an imaging axis X1 at the center. Then, the imaging apparatus 22 extracts feature points that indicate the presence of a target in the captured image. Specifically, the imaging apparatus 22 extracts edge points based on luminance information of the captured image, and performs a Hough transform on the extracted edge points. For example, in the Hough transform, a point on a straight line on which a plurality of edge points are continuously arrayed, or a point at which straight lines intersect is extracted as the feature point. The imaging apparatus 22 may be a single-lens camera or a stereo camera.

The vehicle speed sensor 23 is provided in a rotation shaft that transmits power to the wheels of the own vehicle. The vehicle speed sensor 23 determines a speed of the own vehicle 50 based on the number of rotations of the rotation shaft. The steering angle sensor 24 detects, as a steering angle, an angle by which a steering wheel of the own vehicle 50 is rotatably operated. The yaw rate sensor 25 detects a yaw rate that is actually generated in the own vehicle 50, that is, an angular velocity around the center of gravity of the vehicle. For example, the yaw rate sensor 25 has an oscillator such as a tuning fork, and detects the yaw rate of the own vehicle 50 by detecting skew generated in the oscillator based on a yaw moment of the own vehicle 50. The vehicle speed sensor 23, the steering angle sensor 24, and the yaw rate sensor 25 detect a traveling state (behavior) of the own vehicle 50.

The own vehicle 50 includes a warning apparatus 41, a brake apparatus 42, and a seatbelt apparatus 43 as safety apparatuses that are driven based on control commands from the driving assistance ECU 10.

The warning apparatus 41 is a speaker or a display that is set inside a cabin of the own vehicle 50. When the driving assistance ECU 10 determines that the likelihood of a collision with an obstacle has increased, the warning apparatus 41 notifies a driver of the risk of collision by outputting a warning sound, a warning message, or the like based on the control command from the driving assistance ECU 10.

The brake apparatus 42 is a braking apparatus that applies brakes to the own vehicle 50. When the driving assistance ECU 10 determines that the likelihood of a collision with an obstacle has increased, the brake apparatus 41 operates based on the control command from the driving assistance ECU 10. Specifically, the brake apparatus 42 increases braking force with respect to a brake operation by the driver (brake assistance function), or performs automatic braking when the driver does not perform a braking operation (automatic brake function).

The seatbelt apparatus 43 is a pretensioner that retracts a seatbelt provided for each seat of the own vehicle 50. When the driving assistance ECU 10 determines that the likelihood of a collision with an obstacle has increased, the seatbelt apparatus 43 performs a preparation operation for retraction of the seatbelt based on the control command from the driving assistance ECU 10. In addition, when the collision cannot be avoided, the seatbelt apparatus 43 retracts the seatbelt and eliminates slack, thereby fixing a passenger, such as the driver, to the seat and protecting the passenger.

A target detecting unit 11 acquires first detection information from the radar apparatus 21 and second detection information from the imaging apparatus 22. Then, regarding a first position that is a position obtained from the first detection information and a second position that is a feature point obtained from the second detection information, the target detecting unit 11 associates the first position and the second position that are positioned in proximity as being based on the same target. When a second position is present near the first position, the likelihood of a target actually being present in the first position is high. A state in which the position of a target is accurately acquired by the radar apparatus 21 and the imaging apparatus 22 is referred to as a fusion state. Regarding a target that is determined to be in the fusion state, whether or not the target is continuously in the fusion state is determined with reference to a detection history. Then, when the target is determined to continuously be in the fusion state, the target is determined to be present in that position. In addition, regarding the target that is in the fusion state, should the target be in an undetected state, the target is considered to be present in the previously-detected position for a predetermined period, with reference to the detection history.

Regarding the target that is determined to be in this fusion state, pattern matching using a preliminarily prepared pattern is performed with respect to the second detection information. The target detecting unit 11 then functions as a type determining means. The target detecting unit 11 determines whether the target is a vehicle or a pedestrian, and associates the determination with the target as type. The concept of a pedestrian may also include people on bicycles.

A traveling state calculating unit 12 determines the traveling state of the own vehicle 50 from the detection results of the vehicle speed sensor 23, the steering angle sensor 24, and the yaw rate sensor 25. Specifically, the traveling state calculating unit 12 calculates a movement amount in a lateral direction, a movement amount in a front/rear direction, and a rotation angle per unit time of the own vehicle 50, based on the vehicle speed, the yaw rate, and a vehicle center-of-gravity slip angle from the vehicle speed sensor 23, the steering angle sensor 24, and the yaw rate sensor 25. Calculation methods for these parameters are known. Detailed descriptions are omitted.

Figure 3:
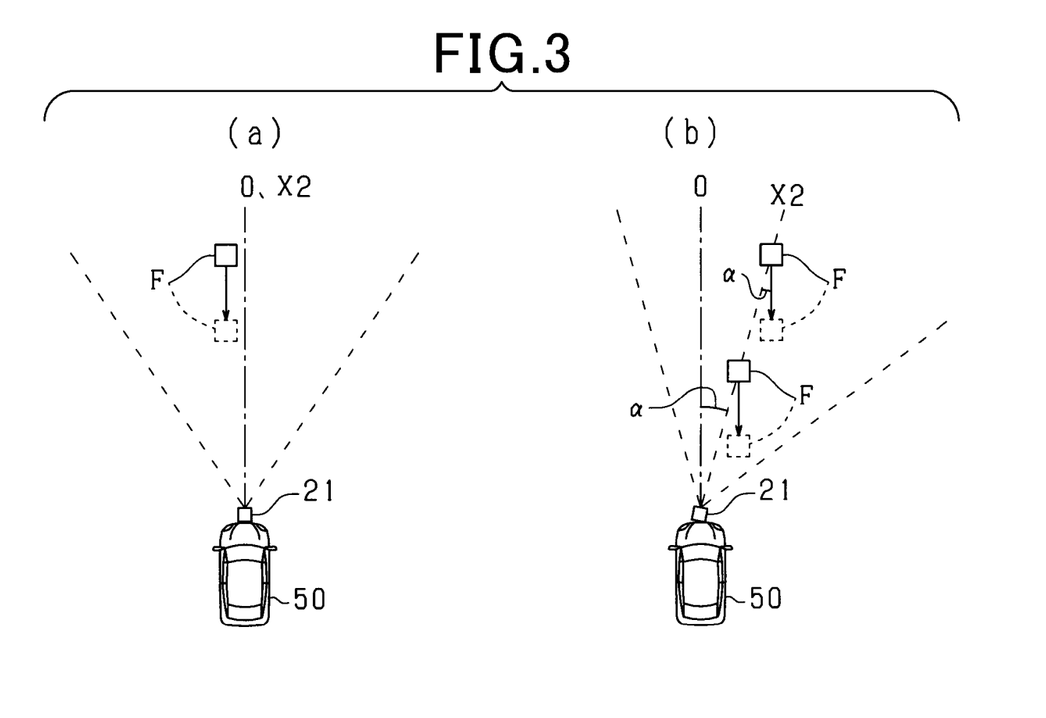
FIG. 3 is an explanatory diagram showing the principle of axial misalignment angle detection according to an embodiment.

An angle calculating unit 30 calculates an axial misalignment angle that is a misalignment amount of an attachment angle (tilt of the attachment angle) of the radar apparatus 21. Here, the calculation principle of the axial misalignment angle will be described. FIG. 3 is a diagram showing an aspect in which, during traveling of the own vehicle 50, a stationary object such as a road-side object is relatively moving with respect to the own vehicle 50. FIG. 3 illustrates, by (a), a state in which the radar apparatus 21 is correctly attached. An axis O (axis in the front/rear direction) of the own vehicle 50 and the optical axis X2 of the radar apparatus 21 match. FIG. 3 illustrates, by (b), a state in which axial misalignment has occurred in the radar apparatus 21. Misalignment by an angle α is present between the axis O of the own vehicle 50 and the optical axis X2.

In the case shown in FIG. 3 by (a), in a straight-ahead traveling state of the own vehicle 50, a target corresponding to a stationary object (referred to, hereafter, as a stationary target F) is detected as directly approaching the own vehicle 50. Meanwhile, in the case shown in FIG. 3 by (b), the stationary target F is erroneously detected as approaching the own vehicle 50 while laterally moving (diagonally moving) at the angle α.

The angle calculating unit 30 acquires axial misalignment information (angle misalignment information) of the radar apparatus 21 from a movement trajectory on which the stationary target F relatively moves with respect to the own vehicle 50. The acquired axial misalignment information is collected in a storage unit such as the RAM of the driving assistance ECU 10. The axial misalignment information stored in the storage unit shows a distribution (dispersion, standard deviation) such as that shown in FIG. 4, due to effects of external noise and the like.

Figure 4:
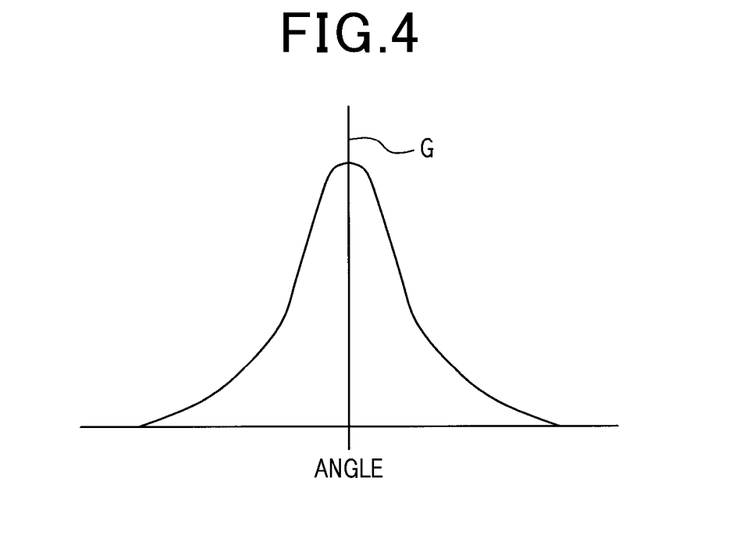
FIG. 4 is a diagram showing a distribution of axial misalignment amount according to an embodiment.

Here, the angle calculating unit 30 calculates the axial misalignment angle by statistically processing the history of the axial misalignment information. For example, an angle corresponding to a center of gravity G in the distribution of the axial misalignment information in FIG. 4 is calculated as the axial misalignment angle. As a result, the effect of dispersion in the axial misalignment information can be suppressed and calculation accuracy regarding the axial misalignment angle of the radar apparatus 21 can be improved.

However, when the axial misalignment angle is calculated by statistical processing of the history of the axial misalignment information, because the collection of axial misalignment information is small immediately after startup of the driving assistance ECU 10, the axial misalignment angle may not be calculated or, even should the axial misalignment angle be calculated, the accuracy thereof is low. For example, in FIG. 5, the axial misalignment angle is in an indeterminate state for a predetermined period (referred to, hereafter, as an initial period T1) after startup of the driving assistance ECU 10.

Figure 5:
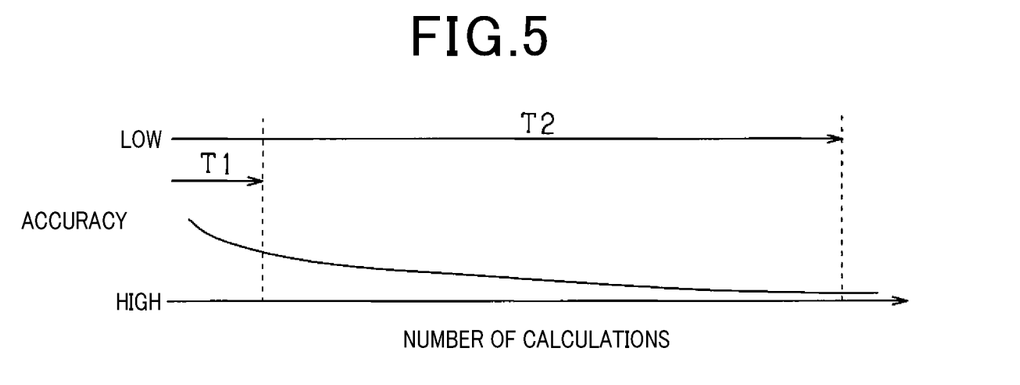
FIG. 5 is a diagram showing a relationship between detection period and accuracy regarding axial misalignment according to an embodiment.

Therefore, until the initial period T1 elapses after startup of the driving assistance ECU 10, the angle calculating unit 30 sets the misalignment amount of the attachment angle of the radar apparatus 21 to a predetermined angle (referred to, hereafter, as an initial angle). The initial angle is predetermined as an axial misalignment angle when axial misalignment occurs during normal use of the own vehicle, rather than that when a vehicle collision is premised. After the elapse of the initial period T1, the axial misalignment angle calculated based on the history of the axial misalignment information is outputted.

It can be determined whether or not the present time is within the initial period T1, based on an acquisition count of the axial misalignment information after startup of the driving assistance ECU 10. That is, a control processing unit 15 determines that the present time is within the initial period T1 when the acquisition count of the axial misalignment information is less than a predetermined first threshold A. The control processing unit 15 determines that the present time is within a period after the elapse of the initial period T1 when the acquisition count of the axial misalignment information is equal to or greater than the first threshold A. For example, the first threshold A is set to n×1000 times (n=1, 2, . . . ).

An axial misalignment correcting unit 31 corrects position information of the optical axis X2 of the radar apparatus 21 based on the axial misalignment angle outputted from the angle calculating unit 30. As a result, the axial misalignment correcting unit 31 corrects position information of the target with respect to the own vehicle 50 recognized by the driving assistance ECU 10.

The angle that can be corrected by the axial misalignment correcting unit 31 is limited to a predetermined angle range (such as an angle range corresponding to the area 61 that can be imaged by the imaging apparatus 22). Therefore, when axial misalignment that is equal to or greater than prescribed occurs in the radar apparatus 21, a state in which the calculation value of the axial misalignment angle of the radar apparatus 21 is equal to or greater than prescribed continues even when correction by the axial misalignment correcting unit 31 is repeated. Therefore, according to the present embodiment, when the state in which the calculation value of the axial misalignment angle of the radar apparatus 21 is equal to or greater than prescribed continues even when correction of the axial misalignment angle by the axial misalignment correcting unit 31 is repeated, collision avoidance control by the driving assistance ECU 10 is prohibited. Details of the determination of whether or not the collision avoidance control is permitted will be described hereafter.

A regulation value calculating unit 13 sets a detection area for detecting a target ahead of the own vehicle 50. The detection area is an area set ahead of the own vehicle 50 in the advancing direction. Whether or not the collision avoidance control can be performed for the target included in the detection area is determined.

An operation determining unit 14 determines whether or not a target is present in the detection area set by the regulation value calculating unit 13. That is, the operation determining unit 14 identifies the target included in the detection area based on the position information of the target after correction by the axial misalignment correcting unit 31. Then, for the target included in the detection area, the operation determining unit 14 calculates a collision prediction time that is the time to collision between the own vehicle 50 and the target. For example, the collision prediction time is calculated based on the distance and between the own vehicle 50 and the target, and the relative speed.

The control processing unit 15 compares the collision prediction time calculated by the operation determining unit 14, and an operation timing individually set for each of the warning apparatus 41, the brake apparatus 42, and the seatbelt apparatus 43, which are the safety apparatuses. Then, when the collision prediction time is less than the operation timing of a safety apparatus, the control processing unit 15 transmits a command signal to the corresponding safety apparatus. As a result, a safety apparatus among at least any of the warning apparatus 41, the brake apparatus 42, and the seatbelt apparatus 43 is operated, and the driver is notified of the risk of collision.

In addition, the control processing unit 15 controls permission and prohibition, and restriction amounts of the operation of each safety apparatus for collision avoidance, based on the magnitude of the axial misalignment angle recognized by the driving assistance ECU 10 and the determination accuracy regarding the axial misalignment. That is, during the initial period T1, permission and prohibition, and restriction amounts of the operation of each safety apparatus are restricted by the operation timing of each safety apparatus being set based on the initial angle (initial mode). After the elapse of the initial period T1, permission and prohibition, and restriction amounts of the operation of each safety apparatus are restricted by the operation timing of each safety apparatus being set based on the axial misalignment angle after correction by the axial misalignment correcting unit 31. Specifically, upon elapse of the initial period T1, when the axial misalignment angle recognized by the driving assistance ECU 10 is within a predetermined allowable range (such as 0.5 deg), the operations of the safety apparatuses are not restricted (normal mode). When the axial misalignment angle upon elapse of the initial period T1 is not within the predetermined allowable range, the operations of the safety apparatuses are restricted based on the axial misalignment angle (restriction mode). In the restriction mode, the extent to which the operations of the safety apparatuses are restricted increases as the axial misalignment angle increases.

After the elapse of the initial period T1, the control mode transitions between the normal mode and the restriction mode based on the axial misalignment angle recognized by the driving assistance ECU 10. That is, when the axial misalignment angle becomes outside the allowable range in the normal-mode state, the control mode transitions to the restriction mode. Meanwhile, when the axial misalignment angle becomes within the allowable range in the restriction-mode (also referred to as a degenerate-mode) state, the control mode transitions from the restriction mode to the normal mode. In this way, after the elapse of the initial period T1, calculation accuracy regarding the axial misalignment angle can be improved. In addition, the effect of suppressing unnecessary collision avoidance control based on the axial misalignment angle recognized by the driving assistance ECU 10 at this time can be improved.

In addition, in cases in which the calculation value of the axial misalignment angle is outside the allowable range even when correction of the axial misalignment angle by the axial misalignment correcting unit 31 is repeatedly performed, the control processing unit 15 prohibits the collision avoidance control. For example, when the axial misalignment angle is outside the allowable range upon elapse of a predetermined period (referred to, hereafter, as a determination period T2) elapses after startup of the driving assistance ECU 10, the control processing unit 31 prohibits the collision avoidance control. For example, the determination period T2 can be determined based on the acquisition count of the axial misalignment information after startup. For example, the determination period T2 is determined to be reached when the acquisition count of the axial misalignment information becomes a second threshold B. For example, the second threshold B is set to n×10,000 times (n=1, 2, 3 . . . ).

Figure 6:
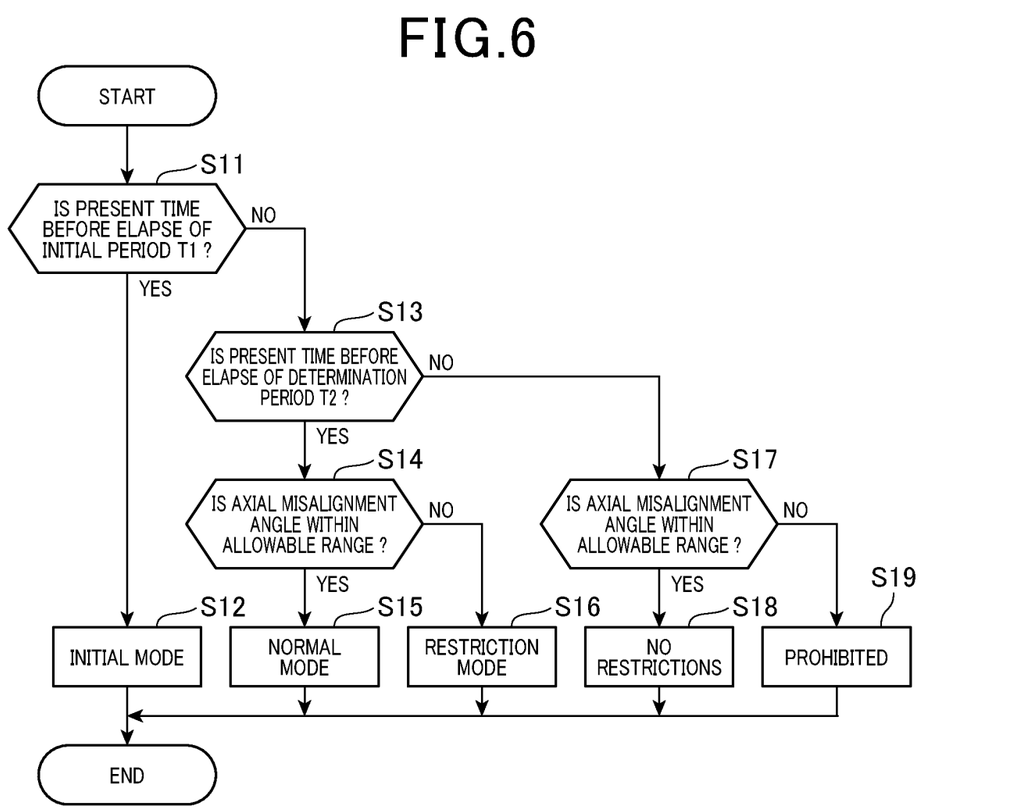
FIG. 6 is an explanatory diagram showing the processing steps for setting a control mode for driving assistance according to an embodiment.

Next, the collision avoidance control performed by the driving assistance ECU 10 will be described with reference to FIG. 6. Each process hereafter is repeatedly performed at a predetermined cycle after startup of the driving assistance ECU 10.

First, the driving assistance ECU 10 determines whether or not the present time is before the elapse of the initial period T1 (step S11). The present process produces an affirmative result when the acquisition count of the axial misalignment information is less than the first threshold A. When determined that the present time is the initial period T1, the driving assistance ECU 10 sets the control mode to the initial mode (step S12). In the initial mode, operations of the safety apparatuses with respect to the target are restricted based on the initial angle. When a negative determination is made at step S11, the driving assistance ECU 10 determines whether or not the present time is before the elapse of the determination period T2 (step S13). The present process is affirmative when the acquisition count of the axial misalignment information is less than the second threshold B.

When determined that the present time is before the elapse of the determination period T2, the driving assistance ECU 10 determines whether or not the axial misalignment angle at this time is within the predetermined allowable range (step S14). When affirmative, the driving assistance ECU 10 sets the control mode to the normal mode (step S15). In the normal mode, the operations of the safety apparatuses with respect to the target are not restricted. When negative at step S14, that is, when the axial misalignment angle is not within the allowable range, the driving assistance ECU 10 sets the control mode to the restriction mode. In the restriction mode, the operations of the safety apparatuses with respect to the target are restricted based on the axial misalignment angle. For example, the extent to which the operations of the safety apparatuses with respect to the target are restricted increases as the axial misalignment angle increases.

When negative at step S13, that is, the present time is at the point of elapse (after the elapse) of the determination period T2, the driving assistance ECU 10 determines whether or not the calculation value of the axial misalignment angle is within the allowable range (step S17). When affirmative at step S17, the driving assistance ECU 10 determines that the operations of the safety apparatuses with respect to the target are not restricted (step S18). When negative at step S17, the driving assistance ECU 10 prohibits the operations of the safety apparatuses with respect to the target (step S19).

Figure 7:
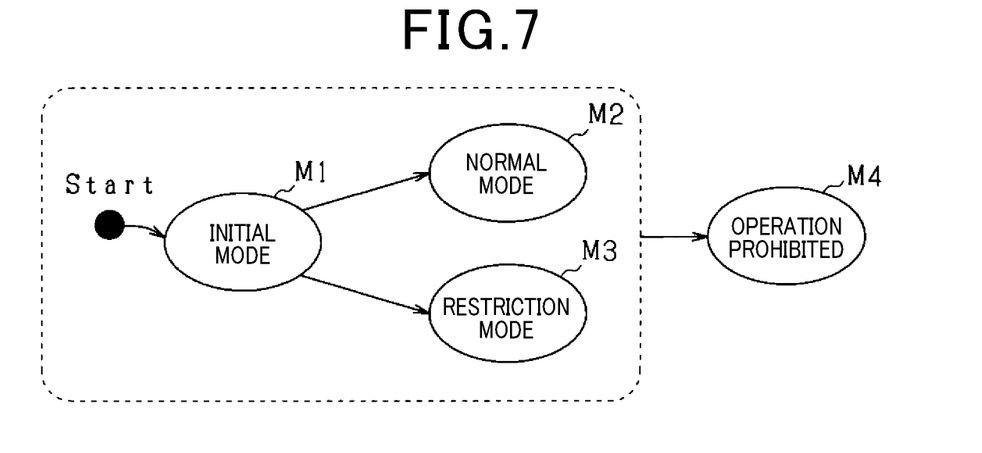
FIG. 7 is an explanatory diagram showing an execution example of a process by a vehicle control apparatus according to an embodiment.

Next, execution examples of the processes in the collision avoidance control according to the present embodiment will be described with reference to FIG. 7. Hereafter, each of the following cases will be described: (1) when axial misalignment does not occur in the radar apparatus 2 before or after startup of the driving assistance ECU 10; (2) when axial misalignment that can be corrected occurs in the radar apparatus 21 before startup of the driving assistance ECU 10; (3) when axial misalignment that cannot be corrected occurs in the radar apparatus 21 before startup of the driving assistance ECU 10, and (4) when axial misalignment that cannot be corrected occurs in the radar apparatus 21 after startup of the driving assistance ECU 10 (during traveling).

(1) When Axial Misalignment does not Occur in the Radar Apparatus 2 Before or after Startup of the Driving Assistance ECU 10

When the driving assistance ECU 10 is started, the collision avoidance control in an initial mode M1 is started. In the initial mode M1, the operations of the safety apparatuses with respect to the target is restricted based on the initial angle. Subsequently, when the acquisition count of the axial misalignment information becomes the first threshold A, the calculation value of the axial misalignment angle is determined to be within the allowable range. The collision avoidance control in a normal mode M2 is started. Subsequently when the acquisition count of the axial misalignment information reaches the second threshold B, the collision avoidance control is not restricted because the calculation value of the axial misalignment angle is within the allowable range.

(2) When Axial Misalignment that can be Corrected Occurs in the Radar Apparatus 21 Before Startup of the Driving Assistance ECU 10

When the driving assistance ECU 10 is started, the collision avoidance control in the initial mode M1 is started. Subsequently, when the acquisition count of the axial misalignment information becomes the first threshold A, a transition to the collision avoidance control in a restriction mode M3 is made because the calculation value of the axial misalignment angle is determined to be outside the allowable range. Subsequently, when the axial misalignment angle of the radar apparatus 21 recognized by the driving assistance ECU 10 becomes within the allowable range as a result of correction of the axial misalignment angle, a transition to the collision avoidance control in the normal mode M2 is made. Subsequently, when the acquisition count of the axial misalignment information reaches the second threshold B, the collision avoidance control is not restricted because the calculation value of the axial misalignment angle is within the allowable range.

(3) When Axial Misalignment that Cannot be Corrected Occurs in the Radar Apparatus 21 Before Startup of the Driving Assistance ECU 10

When the driving assistance ECU 10 is started, the collision avoidance control in the initial mode M1 is started. Subsequently, when the acquisition count of the axial misalignment information becomes the first threshold A, a transition to the collision avoidance control in the restriction mode M3 is made because the calculation value of the axial misalignment angle is determined to be outside the allowable range. Subsequently, the axial misalignment angle is corrected. However, because the state in which the axial misalignment angle recognized by the driving assistance ECU 10 is outside the allowable range continues, the collision avoidance control in the restriction mode M3 is maintained. Subsequently, when the acquisition count of the axial misalignment information becomes the second threshold B, the axial misalignment angle is determined to be outside the allowable range and the collision avoidance control is prohibited (M4).

(4) When Axial Misalignment that Cannot be Corrected Occurs in the Radar Apparatus 21 after Startup of the Driving Assistance ECU 10 (During Traveling)

When the driving assistance ECU 10 is started, the collision avoidance control in the initial mode M1 is started. Subsequently, when the acquisition count of the axial misalignment information becomes the first threshold A, a transition to the collision avoidance control in the normal mode M2 is made because the calculation value of the axial misalignment angle is determined to be within the allowable range. Subsequently, when the radar apparatus 21 becomes displaced in a horizontal direction as a result of light impact on the own vehicle 50 occurring, the calculation value of the axial misalignment angle is determined to be outside the allowable range. A transition from the normal mode M2 to the restriction mode M3 is made. The collision avoidance control in the restriction mode M3 is performed. Subsequently, the state in which the axial misalignment angle is outside the allowable range continues even when the axial misalignment angle is corrected. Therefore, the collision avoidance control in the restriction mode M3 is continued. When the acquisition count of the axial misalignment information becomes the second threshold B, the axial misalignment angle is determined to be outside the allowable range and the collision avoidance control is prohibited (M4).

Here, the radar apparatus 21 according to the present embodiment corresponds to a target detecting means recited in the claims. The angle calculating unit 30 according to the present embodiment corresponds to an acquiring means and an angle calculating means recited in the claims. The axial misalignment correcting unit 31 according to the present embodiment corresponds to a position information correcting means recited in the claims. The control processing unit 15 according to the present embodiment corresponds to a first control means and a second control means recited in the claims. In FIG. 6, the process at step S14 functionally configures a first determining means and a second determining means recited in the claims. In FIG. 6, the process at step S17 functionally configures a third determining means recited in the claims.

As a result of the description above, the following excellent effects can be achieved.

In the configuration in which the axial misalignment angle is calculated by statistical processing of the history of the axial misalignment information acquired after startup of the driving assistance ECU 10, until the predetermined initial period T1 elapses after startup, the axial misalignment angle is not known or, even when the axial misalignment angle is known, the accuracy thereof is low In this regard, through use of the initial angle set in advance, operation restrictions on traveling control can be performed from the beginning of startup of the driving assistance ECU 10. In addition, as a result of the initial angle being provisionally set, unexpected unnecessary operations can be suppressed in traveling control at the beginning of startup of the driving assistance ECU 10. Furthermore, after the initial period T1 elapses after startup of the driving assistance ECU 10, operation restrictions on traveling control are performed based on the calculation value of the axial misalignment angle. Therefore, unexpected unnecessary operations can be suppressed in traveling control, based on the accuracy of the axial misalignment angle at this time.

Difficulty in acquiring misalignment information is expected depending on the road environment and the like in which the own vehicle 50 is traveling. In this regard, it is determined whether or not the present time is within the initial period T1, based on whether the acquisition count of the misalignment information after startup is greater or less than the predetermined first threshold A. Therefore, the initial period T1 can be appropriately determined regardless of differences in the road environment and the like in which the own vehicle 50 is traveling.

When the axial misalignment angle is within the allowable range upon elapse of the initial period T1, a transition to the normal mode M2 in which traveling control is not restricted is made. When the axial misalignment angle is not within the allowable range, a transition to the restriction mode M3 in which the operations of traveling control are restricted is made. Therefore, when detection of the axial misalignment angle becomes possible, traveling control can be appropriately performed based on the detection accuracy regarding the axial misalignment angle and the calculation value of the axial misalignment angle.

Transition can be performed between the normal mode M2 and the restricted mode M3 based on whether or not the axial misalignment angle is within the predetermined allowable range, in the state in which detection of the axial misalignment angle is possible after the elapse of the initial period T1. Therefore, traveling control can be performed in a more appropriate control mode, based on the accuracy of the axial misalignment angle and the calculation value of the axial misalignment angle at this time.

When the axial misalignment angle is determined to not be within the allowable range upon elapse of the predetermined determination period that is longer than the initial period T1, after startup of the driving assistance ECU 10, operation control for traveling control is prohibited. Therefore, when the axial misalignment angle does not become within the allowable range in a state in which the detection accuracy regarding the axial misalignment angle is high, unnecessary traveling control can be prevented from being performed.

The present invention is not limited to the description above and may be carried out in the following manner.

In the description above, in the initial mode or the restriction mode, the collision avoidance control with respect to a target detected by only the radar apparatus 21, of the imaging apparatus 22 and the radar apparatus 21, may be prohibited. In this case, the safety apparatuses are operated only with respect to a target recognized as a target by both the imaging apparatus 22 and the radar apparatus 21, that is, a target that has a high likelihood of being present as an obstacle.

In the description above, the control mode is set based on the acquisition count of the axial misalignment information after startup. However, the control mode may be set based on elapsed time after startup or traveling distance after startup.

In the description above, when axial misalignment occurs in the radar apparatus 21 during traveling of the own vehicle 50, the acquisition count of the axial misalignment information may be recounted from the time of occurrence of the axial misalignment. The occurrence of axial misalignment during traveling of the own vehicle 50 can be determined based on a signal from an acceleration sensor (not shown). In this case, whether or not axial misalignment is present can be more accurately determined, with reference to the time of occurrence of the axial misalignment during traveling of the own vehicle 50. In addition, the collision avoidance control can be more appropriately performed based on the elapsed time from the time of occurrence of the axial misalignment.

In the description above, the detection accuracy regarding the axial misalignment angle of the radar apparatus 21 improves as the period in restriction mode becomes longer. Therefore, the extent of restrictions on the safety apparatuses is preferably adjusted based on the period from transition to the restriction mode.

In the description above, an example is described in which the axial misalignment of the radar apparatus 21 is determined. In addition, the above-described processes may be applied to axial misalignment detection regarding various types of target detection apparatuses that are capable of detecting a target ahead of the own vehicle 50, and calculating the distance between the own vehicle and the target ahead, and a lateral position. For example, the above-described processes may be applied to the detection of axial misalignment of the above-described imaging apparatus 22.

In the description above, an example is given in which unnecessary assistance operations for pre-crash safety as traveling control are restricted based on the detection angle and the detection accuracy regarding axial misalignment of the radar apparatus 21 that serves as the target detection apparatus. In pre-crash safety, a collision between the own vehicle 5 and an obstacle is avoided. In addition, various types of traveling control of the own vehicle 50 with respect to a target ahead of the own vehicle may be restricted based on the detection angle and the detection accuracy regarding axial misalignment. For example, traveling control for adaptive cruise control may be restricted.

While the present disclosure has been described with reference to embodiments thereof, it is to be understood that the disclosure is not limited to the embodiment and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A vehicle control method performed by a vehicle control apparatus that is applied to a vehicle in which a target detector that detects a target in a periphery of an own vehicle is provided, and performs traveling control of the vehicle based on a detection result of the target detector, the vehicle control method comprising:
- a first control step of performing operation restriction on traveling control based on a predetermined initial angle until elapse of an initial period before statistically processing a history after startup of angle misalignment information of the target detector to calculate an axial misalignment angle that is an misalignment amount of an attachment angle of the target detector,
  - the initial angle being predetermined as the misalignment amount of the attachment angle of the target detector during the initial period after the startup,
  - the angle misalignment information of the target detector being calculated based on a detection position of the target by the target detector, and being acquired at a predetermined cycle;
- a second control step of performing the operation restriction on traveling control based on the axial misalignment angle calculated by statistically processing the history after the startup of the angle misalignment information of the target detector after the elapse of the initial period after the startup; and
- a first determining step of determining whether or not the calculated axial misalignment angle is within a predetermined allowable range, until the elapse of the initial period after the startup, wherein:
- the first control step determines that a present time is within the initial period in response to an acquisition count after startup of the acquired angle misalignment information being less than a predetermined first threshold, and performs the operation restriction on traveling control based on the initial angle;
- the second control step determines that the present time is not within the initial period in response to the acquisition count after startup of the acquired angle misalignment information being greater than the first threshold, and performs the operation restriction on traveling control based on the calculated axial misalignment angle; and
- the second control step transitions to a normal mode in which the operation restriction on traveling control is not performed in response to the axial misalignment angle being determined to be within the allowable range at the first determining step upon elapse of the initial period, and transitions to a restriction mode in which the operation restriction on traveling control is performed based on the axial misalignment angle in response to the axial misalignment angle being determined to not be within the allowable range at the first determining step.

2. The vehicle control method according to claim 1, further comprising:
- a second determining step of determining whether or not the calculated axial misalignment angle is within a predetermined allowable range, after the elapse of the initial period after the startup, wherein
- the second control step transitions to the restriction mode in response to the axial misalignment angle being determined to not be within the allowable range at the second determining step while in the normal mode, and transitions to the normal mode in response to the axial misalignment angle being determined to be within the allowable range at the second determining step while in the restriction mode.

3. The vehicle control method according to claim 2, further comprising:
- a third determining step of determining whether or not the calculated axial misalignment angle is within the allowable range in response to the acquisition count of the angle misalignment information reaching a second threshold that is greater than the first threshold, wherein
- the second control step prohibits the operation restriction on traveling control in response to the axial misalignment angle being determined to not be within the allowable range at the third determining step in response to the acquisition count of the angle misalignment information reaching the second threshold.

4. The vehicle control method according to claim 2, further comprising:
- a position information correcting step of correcting information related to the position of the target detected by the target detector based on the acquired axial misalignment angle.

5. The vehicle control method according to claim 1, further comprising:
- a position information correcting step of correcting information related to the position of the target detected by the target detector based on the acquired axial misalignment angle.

6. A vehicle control apparatus that is applied to a vehicle in which a target detector that detects a target in a periphery of an own vehicle is provided, and performs traveling control of the vehicle based on a detection result of the target detector, the vehicle control apparatus comprising:
- a processor, wherein the processor is configured to:
  - acquire, at a predetermined cycle, angle misalignment information of the target detector that is calculated based on a detection position of the target by the target detector;
  - statistically process a history after startup of the angle misalignment information acquired by the processor to calculate an axial misalignment angle that is a misalignment amount of an attachment angle of the target detector;
  - perform operation restriction on traveling control based on a predetermined initial angle until elapse of an initial period before statistically processing the history after the startup of the angle misalignment information to calculate the axial misalignment, the initial angle being predetermined as the misalignment amount of the attachment angle of the target detector during the initial period after the startup;
  - perform the operation restriction on traveling control based on the axial misalignment angle calculated by the processor after the elapse of the initial period after the startup; and
  - determine whether or not the axial misalignment angle calculated by the processor is within a predetermined allowable range, until the elapse of the initial period after the startup, wherein:
- the processor is further configured to:
  - determine that a present time is within the initial period in response to an acquisition count after startup of the angle misalignment information acquired by the processor being less than a predetermined first threshold, and performs the operation restriction on traveling control based on the initial angle;
  - determine that the present time is not within the initial period when the acquisition count after startup of the angle misalignment information acquired by the processor is greater than the first threshold, and perform the operation restriction on traveling control based on the axial misalignment angle calculated by the processor; and transition to a normal mode in which the operation restriction on traveling control is not performed in response to the processor determining that the axial misalignment angle is within the allowable range upon elapse of the initial period, and transition to a restriction mode in which the operation restriction on traveling control is performed based on the axial misalignment angle in response to the processor determining that the axial misalignment angle is not within the allowable range.

7. The vehicle control apparatus according to claim 6, wherein:

the processor is further configured to determine whether or not the axial misalignment angle calculated by the processor is within a predetermined allowable range, after the elapse of the initial period after the startup, wherein the processor transitions to the restriction mode in response to the processor determining that the axial misalignment angle is not within the allowable range while in the normal mode, and transitions to the normal mode in response to the processor determining that the axial misalignment angle is within the allowable range while in the restriction mode.

8. The vehicle control apparatus according to claim 7, wherein:

the processor is further configured to determine whether or not the axial misalignment angle calculated by the processor is within the allowable range in response to the acquisition count of the angle misalignment information reaching a second threshold that is greater than the first threshold, wherein the processor prohibits the operation restriction on traveling control in response to the processor determining that the axial misalignment angle is not within the allowable range in response to the acquisition count of the angle misalignment information reaching the second threshold.

9. The vehicle control apparatus according to claim 8, wherein:

the processor is further configured to correct information related to the position of the target detected by the target detector based on the axial misalignment angle acquired by the processor.

10. The vehicle control method according to claim 3, further comprising:

a position information correcting step of correcting information related to the position of the target detected by the target detector based on the acquired axial misalignment angle.

11. The vehicle control apparatus according to claim 7, wherein:

the processor is further configured to correct information related to the position of the target detected by the target detector based on the axial misalignment angle acquired by the processor.

12. The vehicle control apparatus according to claim 6, wherein:

the processor is further configured to correct information related to the position of the target detected by the target detector based on the axial misalignment angle acquired by the processor.

* * * * *